UNITED STATES PATENT OFFICE.

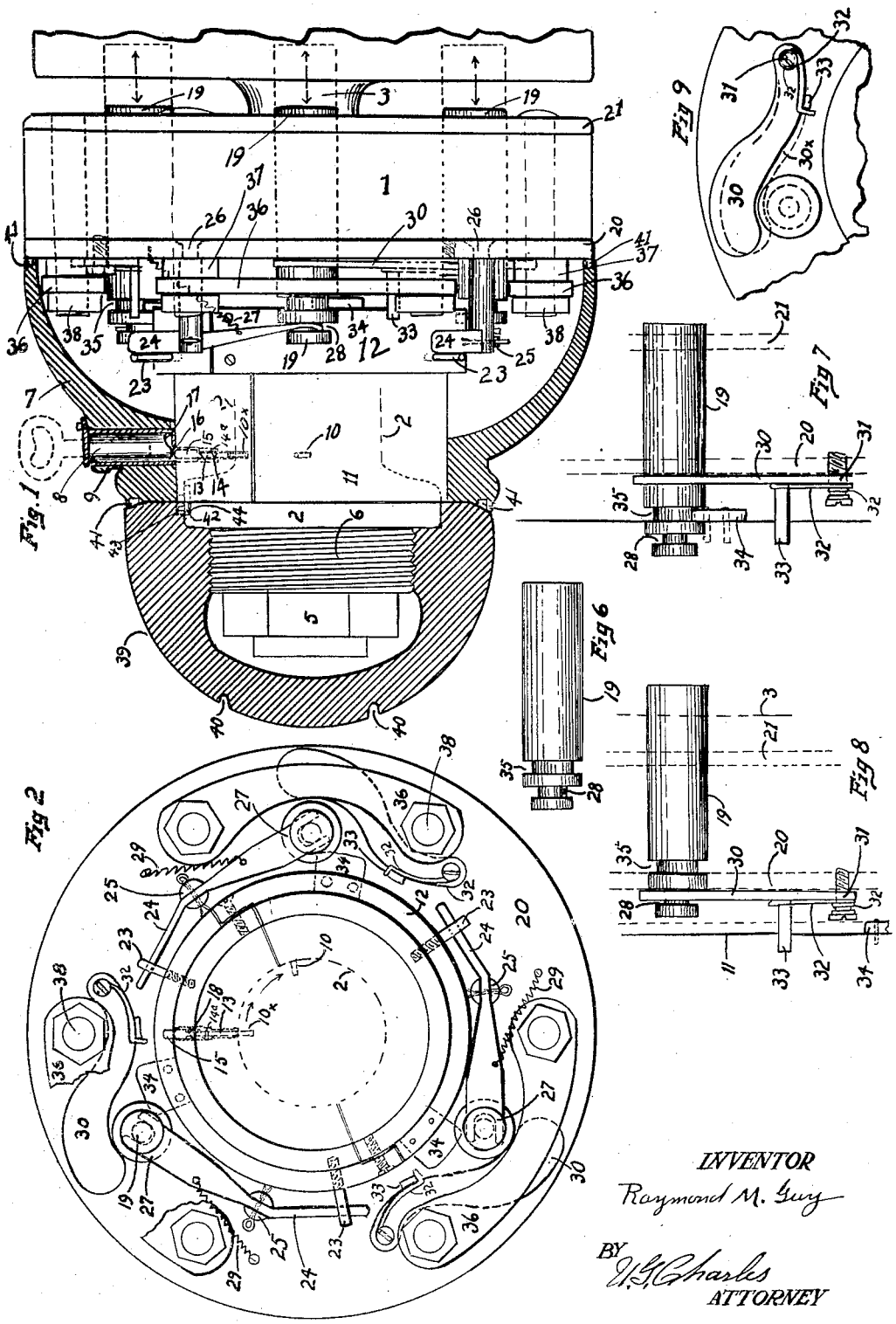

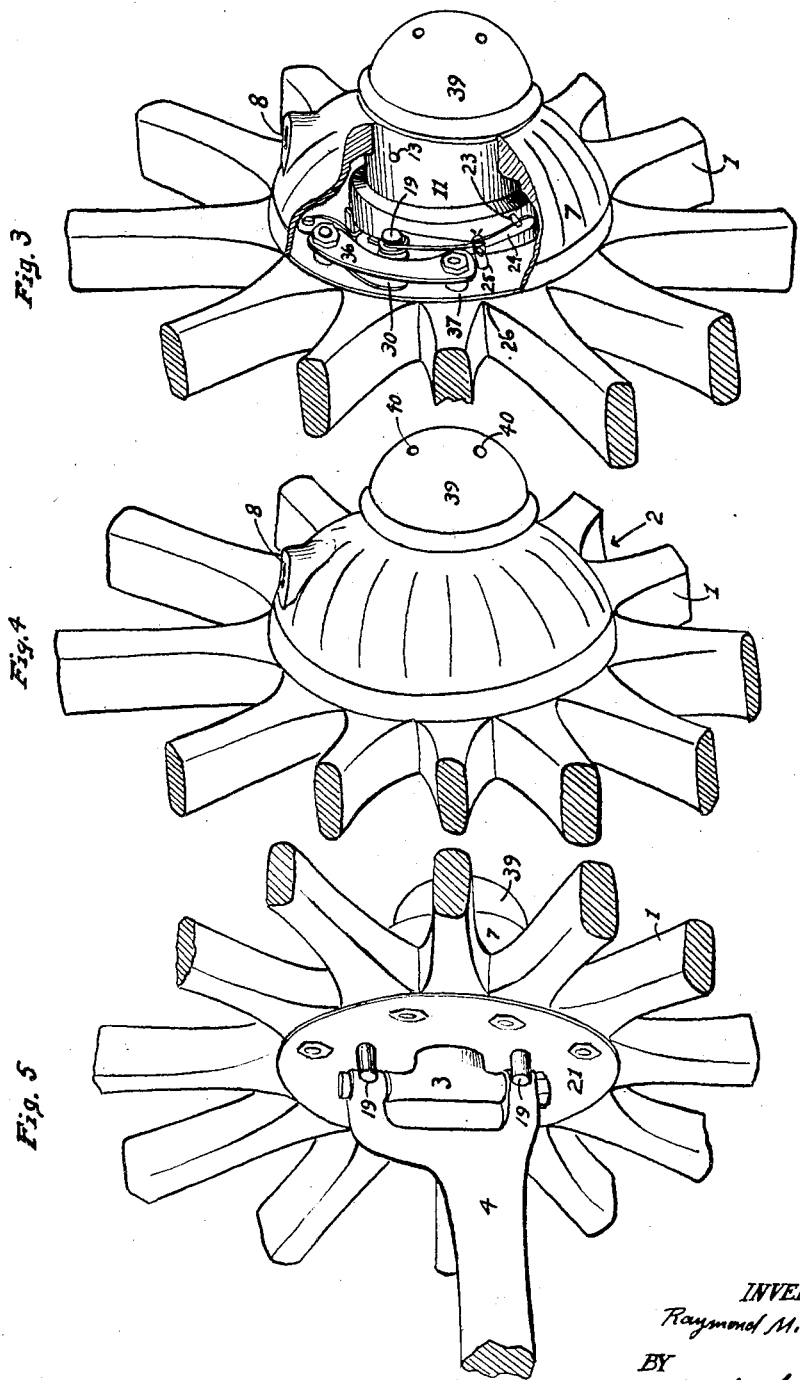

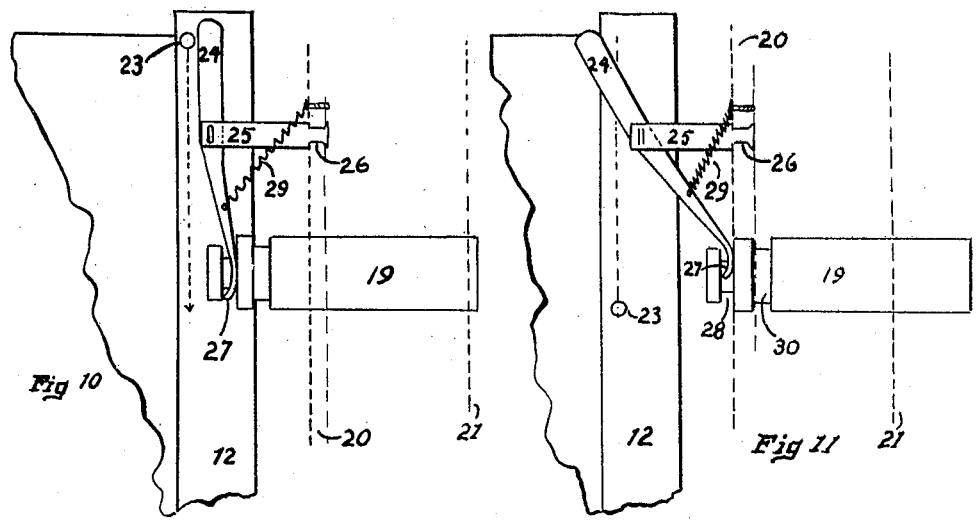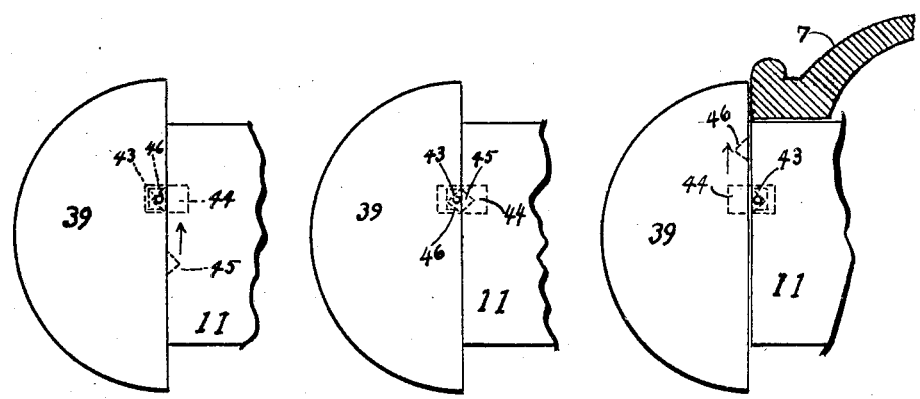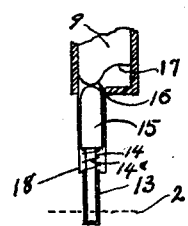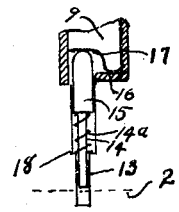

RAYMOND M. GUY, OF WICHITA, KANSAS.

AUTOMOBILE-LOCK.

1,354,102.  Specification of Letters Patent.  Patented Sept. 28, 1920.

Application filed August 21, 1919. Serial No. 318,915.

*To all whom it may concern:*

Be it known that I, RAYMOND M. GUY, a citizen of the United States, and a resident of Wichita, in the county of Sedgwick and State of Kansas, have invented certain new and useful Improvements in Automobile-Locks, of which the following is a description, referring to the drawings which accompany this specification.

The invention has for its object to provide locking mechanism especially adapted for securing one of a set of automobile wheels and thereby insure against the liability of theft, the automobile upon which it is employed. The application of the principles of the invention are more fully explained by reference to the accompanying drawings in which similar numerals of reference refer to corresponding parts throughout.

In the drawings, Figure 1 shows a sectional view through my improved hub cap and case and disclosing the operative mechanism of the invention. Fig. 2 represents a front view of the operating cylinder and plunger controlling mechanism seen in Fig. 1. Fig. 3 shows a view in perspective of a wheel with parts removed to disclose my mechanism for the purposes later described. Fig. 4 is a perspective view of the central portion of an automobile wheel showing the hub cap and case covering the locking mechanism. Fig. 5 is a perspective view of the central portion of an automobile wheel carried by the spindle of an axle and showing the plungers locked upon the spindle to prevent wheel rotation. Fig. 6 is a side view of a locking plunger. Fig. 7 is a side view of a locking plunger with allied members in combination therewith when in the unlocked position. Fig. 8 is a side view of a locking plunger with allied members in combination therewith when in the locked position. Fig. 9 is a fragmentary view of a portion of the mechanism seen in Fig. 1 disclosing the operative movement of a spring catch with reference to a locking plunger. Fig. 10 is a fragmentary side view showing the lifting arm and allied mechanism controlling the locking plunger in unlocked position and Fig. 11 illustrates the position of the parts seen in Fig. 10 when in the locked position. Figs. 12, 13 and 14 are side views of the hub cap and adjacent fragmentary portion of the cylinder and illustrating the means employed for locking the hub cap to the hub by means of said cylinder. Fig. 15 illustrates in perspective the sliding locking plate seen in Figs. 1, 12, 13, and 14. Figs. 16 and 17 show the locking pin and allied mechanism.

Referring to the drawings, an automobile wheel 1 is provided with a hub 2 containing the locking elements comprising my invention, the wheel 1 being mounted upon the spindle 3 carried by the axle 4 of the automobile and held in position by the spindle nut 5. The outer end portion of the hub is threaded at 6. A case 7 covers the operative mechanism surrounding the hub and is provided with a key opening 8 for operating a plunger or other suitable type of lock 9 as later described. At 10 and 10$^x$ Figs. 1 and 2 are shown holes separated a certain arc distance from one another and countersunk in hub 2. The operating cylinder 11 is rotatably mounted around the hub 2 and has a collar 12 integral with said cylinder 11. The operating cylinder 11 is provided with a hole 13 in which is shown a lock pin 14. The location of this hole 13 in the rotatable cylinder 11 is such as to register with either the hole 10 or hole 10$^x$ in the hub 2 as may be desired. The lock 9 is fashioned with a rounded end portion 16 extending beyond a base portion 17; the end 16 in Figs. 1 and 16 is shown pressing against the upper end 15 of the pin 14 thereby forcing the pin 14 down in hole 13 to engage within the countersunk hole 10$^x$. This is the position of the aforementioned parts when the automobile wheel is free to revolve. If now a key be inserted at 8 and lock 9 turned, then by spring pressure 14$^a$ exerted under the upper flanged portion of pin 14 and against the enlarged upper recessed portion of hole 13 as at 18, Figs. 16 and 17, the pin 14 will be forced to rise out of the hole 10$^x$, the head 15 contacting the base 17 of the lock 9 within the case 7. It will thus be seen that by means of the pin 14, the cylinder 11 was in locked engagement with the hub 2 at hole 10 and the cylinder was not locked to the case 7; but when the lock 9 was operated, as above described, and the pin 14 removed from the hole 10 recessed in the hub 2 Fig. 17, then the cylinder 11 was automatically unlocked from the hub 2 but immediately locked to the case 7 by the head 15 on the pin 14 as above described. The case 7 being free to revolve, the cylinder now engaged therewith may then be revolved by the case 7 in the direction of the arrows or until the hole 13 registers with the hole 10 when by turning the key, the end 16 of lock 9 will drive the pin 13 down to engage within the hub hole 10. This rotation of cylinder 11 through this arc serves by mechanism later described to move the plungers 19, which are housed through the front and back flanges 20, 21 of the wheel hub, from the positions indicated by solid lines Fig. 1 upward to the dotted position; the double pointed arrows indicating the direction of travel forward and backward; this dotted position corresponds to the position of the plungers 19 as in Fig. 11 or as seen in Fig. 5 where they are shown extended upon or locked in engagement against the spindle 3, thereby preventing wheel rotation. Case 7 may be rotated to any position when the plungers 19 stand locked or unlocked as in Figs. 7 and 8.

The detail drawing Fig. 10 shows the plunger 19 in the unlocked position seen in Fig. 1. At 23 are shown pins projecting from the cylinder collar 12. Each plunger 19 is operated by a lifting arm 24, hingedly mounted on a pin 25 integral with the hub at 26. The arm 24 is provided with a forked end 27 which engages a groove 28 in the plunger 19. At 29 is seen a tension spring attached between the arm 24 and flange 20, normally tending to pull the plunger 19 from the unlocked position seen in Fig. 10 to the locking position illustrated by Fig. 11. This tendency is counteracted as shown in Figs. 1 and 10 by means of the pin 23 which presses against the outer end of the arm 24. The rotation of cylinder 11 through the arc as previously described concerning Fig. 1, moves the pin 23 in the direction of the arrow Fig. 10 or to the unlocked position Fig. 11, the spring then acting to move the plunger 19 to engage the spindle as in Fig. 5.

A catch 30 Figs. 1, 7, 8 and 9 is hinged at 31 to the hub flange 20. A spring 32 operates against a projecting flange 33 on catch 30 to normally draw said catch to the dotted position 30ˣ Fig. 9 or as seen in Fig. 8 where it is shown engaging the groove 28 to lock the plunger 19 in the position seen in Fig. 5. A lug 34 integral with the cylinder 11 is by the arc rotation of said cylinder moved from its position Fig. 8 toward the flange 33, which it contacts and raises against the spring pressure 32 so that catch 30 is lifted out of groove 28 permitting lifting arm 24 to act as before mentioned to unlock plunger 19, moving same to the position shown in Fig. 7, the lug 34 meanwhile has progressed to engage a slot 35 in the plunger 19, thus serving as a safety catch to prevent possible inward movement of plunger 19 should by any possibility the lifting arm 24 fail to hold said plunger 19 in the unlocked position seen in Fig. 10; this obviates any liability of an accident.

A supporting plate 36 is separated from the hub flange 20 by bushings 37, being secured by the hub bolts 38, the catch 30 operating between said plate 36 and flange 20.

The hub cap 39 has holes 40 countersunk therein, useful for removing the cap from the threaded hub portion 6. The cap 39 is preferably rounded so that a wrench will not engage thereon. Felt packings 41 prevent dust from entering the case 7. The hub cap 39 is locked in Figs. 1 and 12 against the case 7. It is then impossible for a thief to remove the cap 39 so as to unscrew the nut 5 thereby enabling the entire wheel to be removed and another one substituted and the automobile thus be susceptible of being operated and stolen. Fig. 15 shows a sliding locking plate 42 as seen in Fig. 1 having a pin 43 projecting therefrom, this plate 42 is slidably housed in a slot 44 in the hub 2. A V-shaped notch 45 is formed in the cylinder 11 and a similar notch 46 is formed in the hub cap 39. These notches 45 and 46 being formed in the edges of their respective elements 11 and 39 are under certain conditions adapted to register opposite one another. This pin 43 is seen engaged in the notch 46 in Fig. 12, thus locking the hub cap 39, through the pin 43, and the plate 42 to the hub 2; rotating the case 7 and cylinder 11 as previously described moves slot 45, in the direction of the arrow, or to the position opposite pin 43, Fig. 13. Now by turning the hub cap 39 in the direction of the arrow Fig. 14, the notch 46 forces the pin away and into the notch 45, the hub cap being entirely free now for removal.

It is seen therefore that the key operating lock 9 controls all the mechanism affecting the positive locking of the plungers 19 as well as preventing anyone from removing the hub cap 39 to tamper with the locking mechanism.

Such modifications may be employed as lie within the scope of the appended claims.

Having fully described my invention what I now claim as new and desire to secure by Letters Patent is;

1. An automobile wheel hub, plungers slidably housed therein, a cylinder rotatably mounted on said hub and means actuated by the rotation of said cylinder for sliding said plungers to a desired position.

2. An automobile wheel hub, plungers slidably housed through the front and rear flanges thereof, a cylinder rotatably mounted on said hub, a case covering said cylinder and means adapted to engage said case to said cylinder and other means actuated by the rotation of said allied elements for sliding said plungers forward or backward, as desired.

3. In combination as an automobile lock, an axle spindle, a wheel bolted thereon and having a hub with plungers slidably housed through the front and back flanges thereof; a cylinder rotatably mounted on said hub, a case covering said cylinder and means adapted to engage said case to said cylinder and other means actuated by the rotation of said allied elements for sliding said plungers to engage with or disengage from said spindle for the purposes specified.

4. An automobile wheel hub, plungers slidably housed through the front and back flanges thereof, a cylinder rotatably mounted on said hub, a case covering said cylinder, a lock in said case, a spring actuated locking pin housed in said cylinder, said lock and locking pin being adapted to engage or disengage said case and cylinder and other means actuated by the rotation of said case and cylinder when in engagement for sliding said plungers forward or backward as desired.

5. An automobile wheel hub, plungers slidably housed through the front and rear flanges thereof, a cylinder rotatably mounted on said hub, two holes in said hub, a locking pin housed in a hole in said cylinder and adapted to register and be brought into engagement with either of said hub holes.

6. An automobile wheel hub, plungers slidably housed through the front and rear flanges thereof, a cylinder rotatably mounted on said hub, two holes in said hub, a locking pin housed in a hole in said cylinder and adapted to register with and be brought into engagement with either of said hub holes and means actuated by the rotation of said cylinder for sliding said plungers forward or backward and for locking said plungers in either of said positions through the engagement of said locking pin with one or the other of said hub holes in the manner as specified.

7. An automobile wheel hub including plungers slidably housed through the front and back flanges thereof, each plunger engaging with a spring controlled lifting arm, hingedly mounted on a pin integral with the hub and with a spring controlled catch hinged to the hub flange; a cylinder rotatably mounted on said hub, pins and lugs projecting from portions integral with said cylinder; a rotatable case covering said cylinder and means for connecting said case and cylinder whereby rotation of said case operates to occasion specified coaction between the pins and lifting arms, the lugs and spring catches whereby forward or backward movement may be given to said plungers and the elements locked as specified.

8. An automobile wheel hub including grooved plungers slidably housed through the front and back flanges thereof, each plunger engaging with a spring controlled, hingedly mounted, lifting arm and with a spring controlled hinged catch on said hub; a cylinder rotatably mounted on said hub, pins and lugs projecting from portions integral with said cylinder and a rotatable case covering said cylinder, a lock in said case, a locking pin housed in said cylinder, two holes in said hub; said lock and locking pin and hub holes functioning as specified whereby case rotation operates through said pins, lugs, lifting arms and catches to move and lock said plungers in position desired.

9. In combination as an automobile lock, a wheel bolted on an axle spindle having a hub with a sliding locking plate housed therein, grooved plungers slidably housed through the front and back flanges of said hub, each plunger engaging with a spring controlled, hingedly mounted, lifting arm and with a spring catch hinged on said hub; a notched cylinder rotatably mounted on said hub and a rotatable case covering said cylinder; a lock in said case, a locking pin housed in said cylinder, two holes in said hub and a notched hub cap; said lock and locking pin functioning substantially as specified so that the locking plate pin integral with the locking plate may be engaged with either the notched cylinder or notched hub cap for the purposes as specified; and by case rotation the plungers be forced to engage or disengage said spindle through the relative specified movements of the elements included therebetween.

RAYMOND M. GUY.

Witnesses:
NELLIE M. PORTER,
W. A. NETHERCOT.